US012735152B2

(12) United States Patent
Ma et al.

(10) Patent No.: US 12,735,152 B2
(45) Date of Patent: Sep. 15, 2026

(54) METHOD AND SYSTEM FOR FORMATION CONTROL FOR UNMANNED SURFACE VESSEL SWARM VIA COLLABORATIVE EXPLORATION DEEP REINFORCEMENT LEARNING (CEDRL)

(71) Applicant: WUHAN UNIVERSITY OF TECHNOLOGY, Wuhan (CN)

(72) Inventors: Yong Ma, Wuhan (CN); Wenqi Wang, Wuhan (CN); Yujiao Zhao, Wuhan (CN); Hanluan Xiong, Wuhan (CN); Zizhuo Wang, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 0 days.

(21) Appl. No.: 19/206,466

(22) Filed: May 13, 2025

(65) Prior Publication Data

US 2025/0353580 A1 Nov. 20, 2025

(30) Foreign Application Priority Data

May 15, 2024 (CN) ........................ 202410599371.X

(51) Int. Cl.
*B63B 35/00* (2020.01)
*G05B 13/02* (2006.01)

(52) U.S. Cl.
CPC ............ *B63B 35/00* (2013.01); *G05B 13/027* (2013.01); *B63B 2035/007* (2013.01)

(58) Field of Classification Search
CPC .. B63B 35/00; B63B 2035/007; G05B 13/027
USPC ........................................................... 701/21
See application file for complete search history.

(56) References Cited

U.S. PATENT DOCUMENTS

| | | | | |
|---|---|---|---|---|
| 12,466,523 | B1 * | 11/2025 | Tate | B63B 49/00 |
| 2016/0147223 | A1 * | 5/2016 | Edwards | B63B 1/12 701/2 |

FOREIGN PATENT DOCUMENTS

| | | | | |
|---|---|---|---|---|
| CA | 3017938 C | * | 5/2024 | G01V 1/38 |
| CN | 116674705 A | * | 9/2023 | B63B 35/00 |
| CN | 118938908 A | * | 11/2024 | G05D 1/622 |

* cited by examiner

*Primary Examiner* — Phutthiwat Wongwian
(74) *Attorney, Agent, or Firm* — Troutman Pepper Locke LLP; Tim Tingkang Xia, Esq.

(57) ABSTRACT

The present disclosure discloses a method and system for formation control for an USV swarm via a CEDRL. The method includes: designing a desired formation pattern based on a formation hierarchical virtual leader strategy, establishing an USV desired location library, and assigning a location index to a desired location of each USV in a formation; updating the desired location of each USV and the corresponding location index via an USV formation local consensus strategy in a case where there is a risk of collision between USVs; and acquiring an actual geolocation of each USV in real time, and adopting a surface vessel control decision-making network to direct the USV toward a latest desired location. An autonomous collaborative formation of a large-scale USV swarm may be realized by the present disclosure.

12 Claims, 3 Drawing Sheets

METHOD AND SYSTEM FOR FORMATION CONTROL FOR UNMANNED SURFACE VESSEL SWARM VIA COLLABORATIVE EXPLORATION DEEP REINFORCEMENT LEARNING (CEDRL)

CROSS-REFERENCE TO RELATED APPLICATION

This application claims priority to and benefit of Chinese Patent Application No. 202410599371.X, filed May 15, 2024, which is hereby incorporated herein in its entirety by reference.

TECHNICAL FIELD

The present disclosure belongs to the technical field of formation control for USV (unmanned surface vessel) swarms, and more specifically relates to a method and system for formation control for a large-scale USV swarm via a CEDRL (collaborative exploration deep reinforcement learning).

BACKGROUND OF THE INVENTION

A ship swarm can perform tasks such as a water area survey and a data collection at a lower cost and higher efficiency, replacing personnel in dangerous and challenging tasks such as a maritime patrol, disaster prevention and rescue, and a marine resource development, and safeguarding the safety of personnel's lives. Research on a technology for formation navigation of large-scale ship swarms is of great significance and has far-reaching implications for sustainable development and innovation in marine and water-related fields, helping to improve efficiency, reduce risks, protect the environment, safeguard national security, and promote scientific research.

At this stage, all major global maritime powers have focused on fields of intelligent ships and USVs and invested huge resources, but a good synergy has not yet been formed in a field of formation control research on USV swarms.

In the technical field of control of USV swarms, advanced communication and perception technology breakthroughs have contributed to the rapid development of a collaborative control technology for USV swarms. Researchers have developed various swarm collaborative algorithms and control algorithms for coordinating and controlling behaviors of USV swarms.

However, at this stage, the swarm formation control algorithms have not yet effectively solved a problem of autonomous control of a large-scale USV swarm of more than 30 vessels. Autonomous and collaborative capabilities of the USVs within the swarm is limited, the flexibility of control of a formation pattern for a formation is poor, thus it is difficult to change the formation pattern quickly, and it is difficult to realize collision avoidance in a limited space when there is a collision conflict between the vessels. An USV motion controller is complex in design, and it is difficult to realize fast decision making.

SUMMARY OF THE INVENTION

In response to the above defects or improvement needs of the prior art, the present disclosure provides a method and system for formation control for aUSV swarm via CEDRL, which are applicable to formation swarm autonomous control of a large-scale USV swarm.

In order to achieve the above purpose, according to a first aspect of the present disclosure, a method for formation control for aUSV swarm via CEDRL is provided, including:

designing a desired formation pattern based on a formation hierarchical virtual leader strategy, establishing aUSV desired location library, assigning a location index to a desired location of each USV in a formation, and establishing a matching relationship between the USV and the corresponding desired location;

updating the desired location of each USV and the corresponding location index via an USV formation local consensus strategy in a case where there is a risk of collision between USVs; and acquiring an actual geolocation of each USV in real time, and adopting a surface vessel control decision-making network to direct the USV toward a corresponding latest desired location; wherein the surface vessel control decision-making network is obtained by training based on the CEDRL.

According to a second aspect of the present disclosure, a system for formation control for a USV swarm via CEDRL is provided, including:

a USV desired location library, designing a desired formation pattern based on a formation hierarchical virtual leader strategy, being established, assigning a location index to a desired location of each USV in a formation, and establishing a matching relationship between the USV and the corresponding desired location;

a location index updating unit, configured to update the desired location of each USV and the corresponding location index via a USV formation local consensus strategy in a case where there is a risk of collision between USVs; and an USV control unit, configured to acquire an actual geolocation of each USV in real time, and adopt a surface vessel control decision-making network to control the USV to follow a corresponding latest desired location to navigate; wherein the surface vessel control decision-making network is obtained by training based on the CEDRL.

According to a third aspect of the present disclosure, a computer-readable storage medium is provided, storing a computer program thereon. The computer program, in a case of being executed by a processor, implements steps of the method according to any one of the above.

Overall, compared with the prior art, the above technical solutions contemplated by the present disclosure can achieve the following beneficial effects.

A top-down "formation pattern design-real time scheduling-motion control" architecture is adopted to design the desired formation pattern based on the formation hierarchical virtual leader strategy, and the desired location of each USV in the large-scale formation is quickly matched using the location index in the established USV desired location library. An USV local collaboration is realized via the USV formation local consensus strategy, which solves the problem of collision avoidance of the USVs within the formation. The design of the CEDRL improves training efficiency of the surface vessel control decision-making network, and realizes accurate and flexible large-scale USV formation control.

DETAILED DESCRIPTION OF THE INVENTION

To make the objective, technical solutions and advantages of the present disclosure clearer and more comprehensible, the present disclosure is further described below in detail in conjunction with accompanying drawings and embodiments. It should be understood that the specific embodiments described herein are only used to explain the present invention and are not used to limit the present invention. Furthermore, technical features involved in implementations of the present disclosure described below may be combined with each other as long as they do not constitute a conflict with each other.

Figure 1:
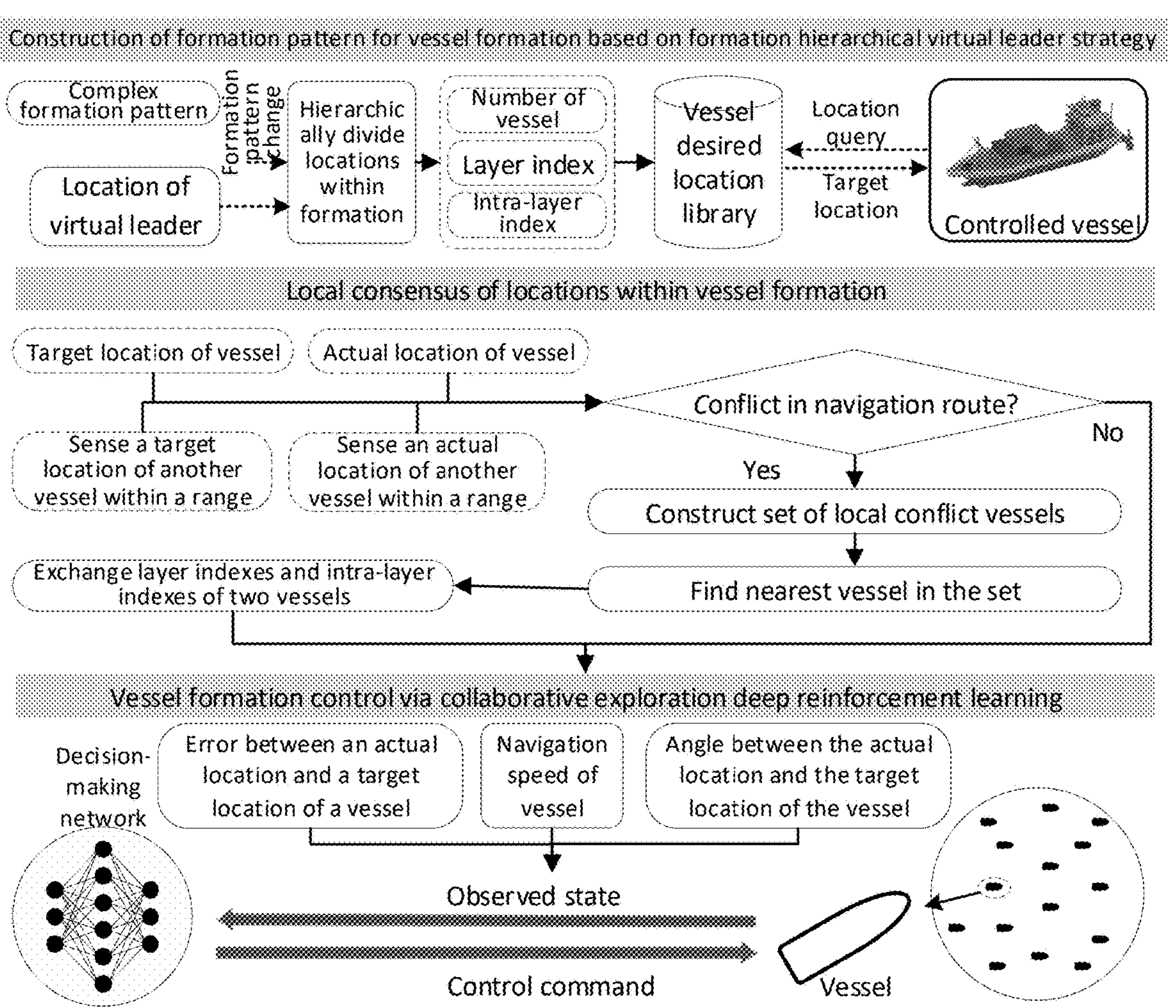
FIG. 1 is a framework diagram of a method provided by an embodiment of the present disclosure.

The present invention provides a method for formation control for a USV swarm via CEDRL, as shown in FIG. 1, including the following.

S1, a desired formation pattern is designed based on a formation hierarchical virtual leader strategy, a USV desired location library is established, a location index is assigned to a desired location of each USV in a formation, and a matching relationship is established between the USV and the corresponding desired location.

The desired formation pattern is preset according to a USV scale, a navigation route, and specific navigation requirements, and may be changed during navigation. The desired formation pattern is usually assigned by a shore base, received remotely by all USVs in the formation, and stored in the USV desired location library of each USV.

When the number of USVs in the formation is large, the amount of data in the USV desired location library is huge, so the present invention can quickly acquire the desired location of each USV in a manner of establishing the location index. The location index includes a layer index and an intra-layer index to enable the USV to query the desired location in the USV desired location library according to the layer index and the intra-layer index of the desired location. When the formation pattern is changed, it is only necessary to update the USV desired location library and index values according to the formation pattern.

According to the location index, the desired location of the USV is expressed as: desired location coordinates of a k-th USV of an l-th layer in the USV formation at a specific moment. Specifically, the desired location and actual geolocation of the USV in the design of the formation pattern for the formation may be expressed as:

$$P^d(t)=\left\{\left(x^d_{l,k_l}(t),\ y^d_{l,k_l}(t)\right)\middle| l,\ k_l\in N^*,\ \sum\nolimits_{l=1}^{L}k_l=M\right\}$$

$$P(t)=\left\{\left(x_{l,k_l}(t),\ y_{l,k_l}(t)\right)\middle| l,\ k_l\in N^*,\ \sum\nolimits_{l=1}^{L}k_l=M\right\}$$

where L is the number of divided layers, $$P^d(t)=\left\{\left(x^d_{l,k_l}(t),\ y^d_{l,k_l}(t)\right| i\in N^*,\ i<M\right\}$$

represents a desired location of an USV, $P(t)=\{(x_{l,k_l}(t), y_{l,k_l}(t))|i\in N^*, i<M\}$ represents an actual geolocation of the USV, $$\left(x^d_{l,k_l}(t),\ y^d_{l,k_l}(t)\right.$$

represents coordinates of a desired location of a $k_l$-th USV in an l-th layer in the USV formation at a moment t, $(x_{l,k_l}(t), y_{l,k_l}(t))$ represents coordinates of an actual geolocation of the $k_l$-th USV in the l-th layer in the USV formation at the moment t, l represents a layer index of the location of the USV in the formation, $k_l$ represents an intra-layer index, $N^*$ is a set of positive integers, and M is the number of USVs in the formation.

Figure 2:
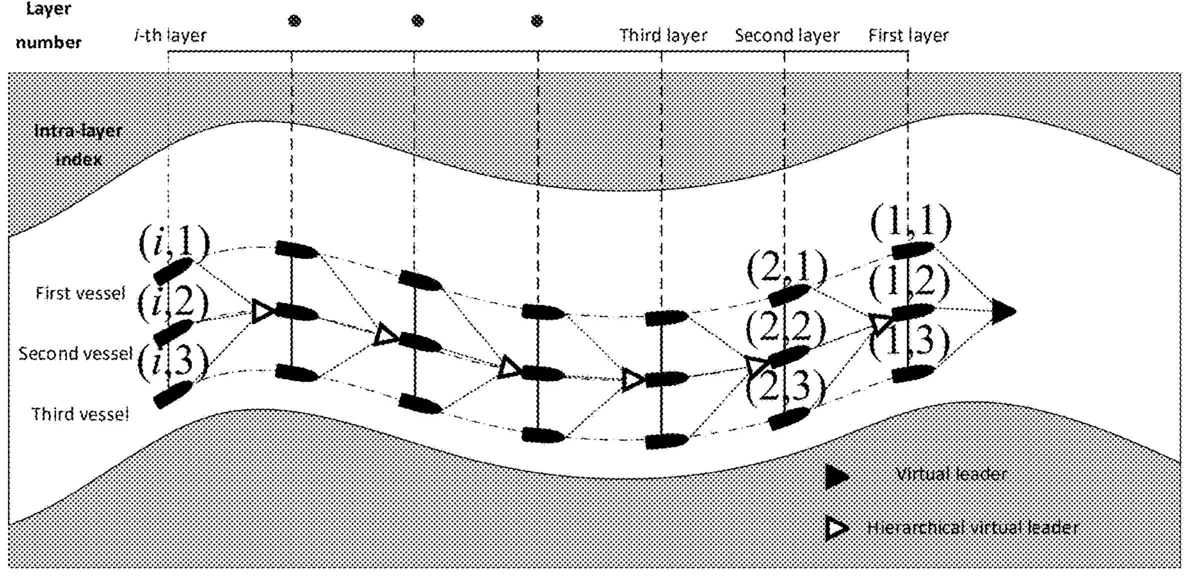
FIG. 2 is a diagram of aUSV location assignment strategy based on a formation hierarchical virtual leader strategy provided by an embodiment of the present disclosure.

In some embodiments, as shown in FIG. 2, a virtual leader is set. The virtual leader is not a physical USV, but only a virtual target, which contains coordinate information, a state and other virtual USV information. Similarly, a hierarchical virtual leader is set for each layer, forming a certain location relationship with the virtual leader. Location information of each USV in the formation is ultimately determined by relying on the preset formation, a layer where it is located, and location relationships with the hierarchical virtual leader and the virtual leader, and ultimately the USV desired location library is constructed.

S2, the desired location of each USV and the corresponding location index are updated via an USV formation local consensus strategy in a case where there is a risk of collision between USVs, which specifically includes following steps.

S201, in a case of USV formation and formation pattern change, if there is a USV in the formation whose actual geolocation is at a distance greater than a preset value from a desired location, and there is another USV in the formation between the actual geolocation and the desired location of the USV, it is determined that the USV is at risk of collision.

In a specific navigation process of the USV, the USV in the formation may be out of location. If a formation pattern change instruction is received at this time, its actual geolocation is far away from the desired location, and there is another USV therebetween, then the USV and the another USV are at risk of collision. At this time, collision avoidance control is required.

S202, the USV that is at risk of collision is used as a current controlled USV. A set of USVs that are in conflict with the current controlled USV is constructed by comparing an actual geolocation and desired location of the current controlled USV, a USV with a highest risk of collision is found, and location indexes of the two USVs are exchanged. Index values of a corresponding layer index and intra-layer index as well as a desired location in the USV desired location library are synchronously updated.

Figure 3:
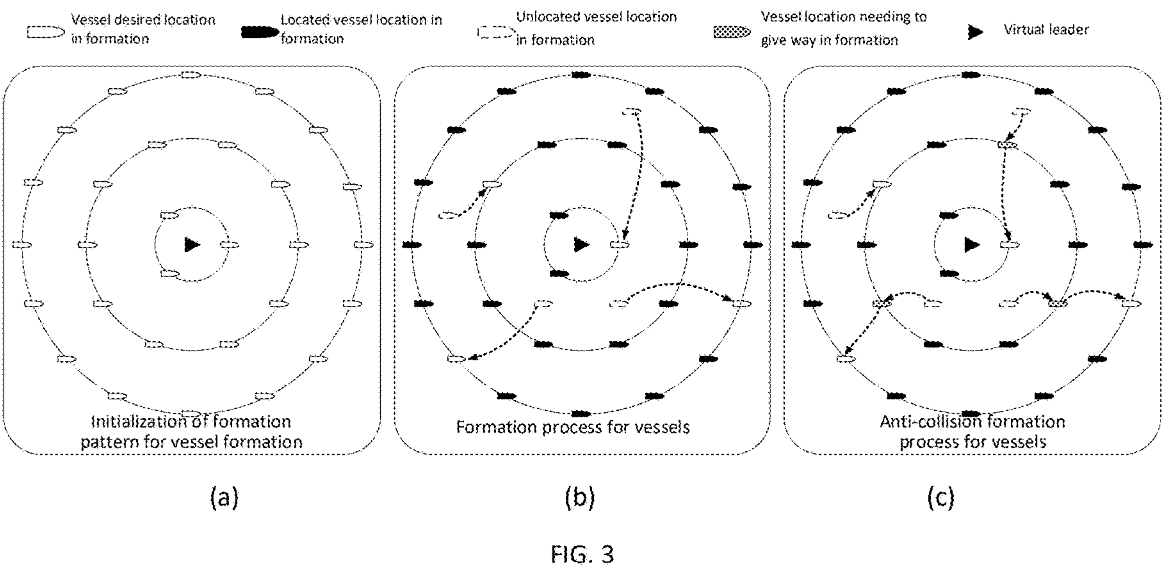
FIG. 3 is a diagram of a local consensus strategy for a large-scale USV formation provided by an embodiment of the present disclosure.

In some embodiments, as shown in FIG. 3(*a*), in a formation pattern initialization state of the USV formation, a preliminary formation pattern has been formed, and a certain distance and location relationship is constituted between desired locations of the USVs in the formation and the virtual leader. As shown in FIG. 3(*b*), when the formation pattern change instruction is received, the USVs need a reformation. A certain USV in the formation finds that a distance between its actual geolocation and a desired location exceeds a certain preset distance, i.e., it is at an unlocated USV location. But there is no another USV in a process of navigating from the unlocated USV location to the desired location, so there is no risk of collision. As shown in FIG. 3(*c*), when the formation pattern change instruction is received, the USVs need a reformation. A certain USV in the formation finds that a distance between its actual geolocation and a desired location exceeds a certain preset distance, i.e., it is at an unlocated USV location, and there is another USV in a process of navigating to the desired location, i.e., the another USV is at a USV location that needs to give way in the formation. Then a set of USVs that are in conflict with this USV is constructed. A USV with a highest risk of collision is selected to communicate with it, and exchanges desired locations and corresponding location indexes with it. In some embodiments, the desired location update frequency≥1 Hz.

Each USV in the formation performs the above judgment and operation, and ultimately the collision avoidance control of the whole formation is completed.

The set of USVs that are in conflict with this USV is constructed mainly by judging whether there is a danger of collision between every two, which specifically considers following two main parameters.

1) Closest point of approach (CPA). CPA refers to an expected point of intersection between two USVs at a closest distance. By calculating the CPA, a minimum relative distance between USVs may be judged. If this minimum distance is too small, it indicates that there is a risk of collision.
2) Time to closest point of approach (TCPA) The TCPA refers to a relative minimum time between the two USVs at the expected CPA. By calculating the TCPA, the minimum relative time between the USVs may be judged. If this minimum time is very short, it indicates that there is a risk of collision.

When the CPA is smaller (e.g., less than a certain preset value) and the TCPA is shorter (e.g., less than a certain preset value), it indicates that the two USVs have a close distance and a short time, and there is a danger of collision.

The construction of the set of USVs that are in conflict with this USV is completed by summarizing all the USVs that are in danger of collision with this USV. All the USVs are within the formation, and USVs outside the formation are not contemplated by the present disclosure.

S3, an actual geolocation of each USV is acquired in real time, and a surface vessel control decision-making network is adopted to direct the USV toward a corresponding latest desired location. The surface vessel control decision-making network is obtained by training based on the CEDRL. The architecture of the surface vessel control decision-making network is implemented using the PPO (Proximal Policy Optimization) algorithm.

Since the desired location contains a time and location coordinates, the entire navigation can be completed by only cycling the control so that the USV always follows the corresponding latest desired location to navigate.

Figure 4:
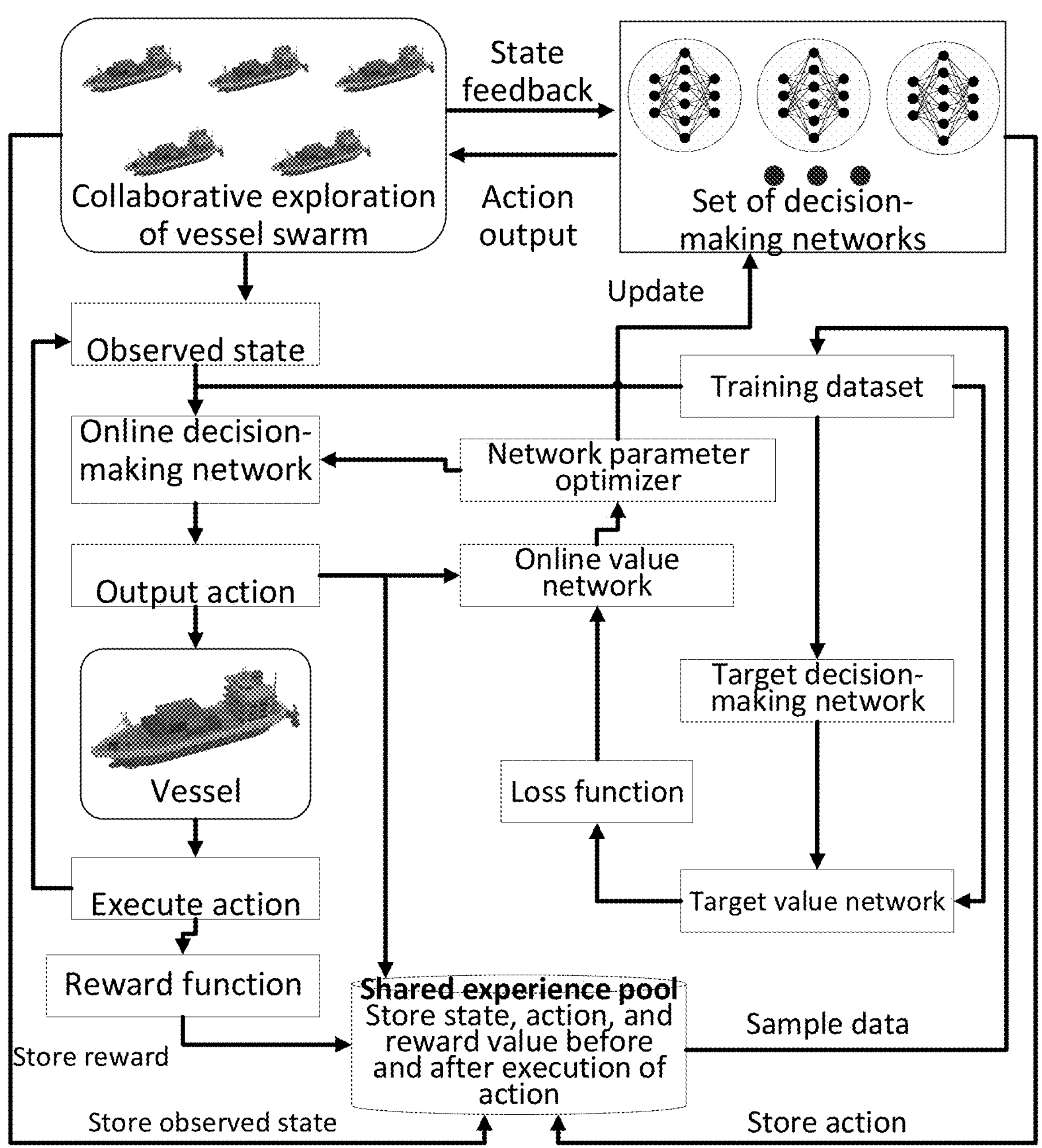
FIG. 4 is a flowchart for training an USV decision-making network based on a CEDRL provided by an embodiment of the present disclosure.

As shown in FIG. 4, the CEDRL includes designs of a state space, an action space, a decision-making network, and a reward function. The state space includes a motion state of an USV, as well as a relative angle and distance between the USV and a desired location. The action space includes a control input of the USV, including: thrust in a heave direction and torque in a yaw direction.

The CEDRL algorithm acquires an observed state via a collaborative exploration of the USV swarm, and uses the observed state as an input to the online decision-making network. The online decision-making network outputs a USV control instruction. The USV re-observes a new state after executing the control instruction. The reward function calculates a reward value according to the updated observed state after the execution of the control instruction by the USV, forms an experience value from the observed state before the execution of the control instruction, the executed USV control instruction, the reward value, and the observed state after the execution of the control instruction, and stores the experience value into a shared experience pool. Further, data are sampled from the shared experience pool to form a training dataset to train the decision-making network. The network training process is a conventional technology and may refer to a DDPG (Deep Deterministic Policy Gradient) algorithm.

Further, the reward function is set by a distance between an actual geolocation and desired location of aUSV, an error angle between an actual heading angle of the USV and a desired heading angle of the USV, a component of a speed of the USV at the error angle, and corresponding weight coefficients. In one embodiment of the present disclosure, the reward function is designed as:

$$\text{reward} = w_d \cdot e_d + w_a \cdot \left|\frac{e_a}{\pi}\right| + w_v \cdot v\cos(e_a)$$

where $e_d$, $e_a$, and v represent a distance between the USV and a target location, the error angle between the actual heading angle of the USV and the desired heading angle of the USV, and the speed of the USV respectively, a unit of $e_a$ is m, a unit of $e_a$ is radian, and a unit of v is m/s. However, these values need to be normalized, and may be used directly. $w_d$, $w_a$, and $w_v$ are all weight coefficients greater than zero, and $$w_d + w_a + w_v = 1.$$

At an environment state exploration stage of the CEDRL, exploration experience is stored, via a parallel exploration of individuals in the USV formation, into the shared experience pool to be used to train the surface vessel control decision-making network. Decision-making network parameters are synchronized at preset intervals, a learning progress of the decision-making network is balanced, and an overall training progress is promoted. In this embodiment, an algorithmic model of the surface vessel decision-making network is first established at the shore base. Then each USV is allowed to acquire exploration experience by trial and error. All the collected exploration experience is uploaded to the shared experience pool at the shore base as training data. The shore base uses the training data to train the surface vessel decision-making network. After the shore base has trained the model, the surface vessel decision-making network is downloaded to each USV, allowing the USV to follow the corresponding latest desired location to navigate according to the trained surface vessel decision-making network.

In one embodiment of the present disclosure, the surface vessel control decision-making network includes an online decision-making network and a target decision-making network, a same fully-connected network structure is adopted, the number of network nodes is designed to be (400*300*2), and an activation function of each layer is (Relu, Relu, Tanh) respectively. A value network includes an online value network and a target value network, a same fully-connected network structure is adopted, the number of network nodes is designed to be (400*300*1), and an activation function of each layer is (Relu, Relu, None) respectively.

It needs to be noted that the activation function mentioned above is a generalized conventional technology and is a structural function in a neural network; the reward function is designed in this case; and the exploration function is a part in the reinforcement learning algorithm that corresponds to the previous environment exploration stage, and an output of this function is consistent with an output of the decision-making network, which may be regarded as a random number generation, that is, some random instructions are generated via this function to control the trial and error of the USV, which is also a conventional technology.

As a second aspect of the present disclosure, a system for formation control for aUSV swarm via a CEDRL is provided, including:

- an USV desired location library, designing a desired formation pattern based on a formation hierarchical virtual leader strategy, being established, assigning a location index to a desired location of each USV in a formation, and establishing a matching relationship between the USV and the corresponding desired location;
- a location index updating unit, configured to update the desired location of each USV and the corresponding location index via an USV formation local consensus strategy in a case where there is a risk of collision between USVs; and
- aUSV control unit, configured to acquire an actual geolocation of each USV in real time, and adopt a surface vessel control decision-making network to direct each USV toward a corresponding latest updated desired location. The surface vessel control decision-making network is obtained by training based on the CEDRL.

This system is set in a main control unit of each USV in the formation. Each USV acquires its own required physical parameters via a sensor and a locating system, and acquires physical parameters of other USVs in the formation via inter-vessel communication links. The sensor is a kind of onboard localization sensors, eg. GPS/INS. The inter-vessel communication links is a generalized wireless communication system, eg. bridge-to-bridge radio. The USV is connected to the shore base via the generalized wireless communication system to acquire a formation pattern change instruction sent by the shore base.

The training of the surface vessel control decision-making network based on the CEDRL is completed at the shore base, and the trained surface vessel control decision-making network is then downloaded to each USV.

A specific operating process of the system of the present disclosure is described below using a certain USV in the formation as an example.

SS1. Establishment of an USV desired location library.

The USV desired location library designs a desired formation based on a formation hierarchical virtual leader strategy, is established, assigns a location index to a desired location of each USV in the formation, and establishes a matching relationship between the USV and the corresponding desired location.

SS2, pre-processing, i.e., an environment state exploration stage.

At the environment state exploration stage of the CEDRL, exploration experience is stored, via a parallel exploration of individuals in the USV formation, into the shared experience pool to be used to train the surface vessel control decision-making network. Decision-making network parameters are synchronized at preset intervals, a learning progress of the decision-making network is balanced, and an overall training progress is promoted.

Specifically, an algorithmic model of the surface vessel decision-making network is first established at the shore base. Then each USV is allowed to acquire exploration experience by trial and error. All the collected exploration experience is uploaded to the shared experience pool at the shore base as training data. The shore base uses the training data to train the surface vessel decision-making network. After the shore base has trained the model, the surface vessel decision-making network is downloaded to each USV.

The CEDRL includes designs of a state space, an action space, a decision-making network, and a reward function. The state space includes a motion state of an USV, as well as a relative angle and distance between the USV and a desired location. The action space includes a control input of the USV, including: thrust in a heave direction and torque in a yaw direction. The reward function is set by a distance between an actual geolocation and desired location of an USV, an error angle between an actual heading angle of the USV and a desired heading angle of the USV, a component of a speed of the USV at the error angle, and corresponding weight coefficients.

SS3, this USV acquires an actual geolocation of each USV in the formation in real time, and the surface vessel control decision-making network is adopted to control this USV to follow a corresponding latest desired location to navigate. The latest desired location is obtained by querying the USV desired location library established by SS1.

SS4, when a formation pattern change instruction is received, the USV desired location library updates the location index of each USV according to the latest formation pattern change instruction. This USV acquires a corresponding latest desired location and judges that there may be a risk of collision with another USV in a path between its actual geolocation and the latest desired location, then a set of USVs that are in conflict with this USV is constructed, an USV with a highest risk of collision is found, and desired locations and location indexes between this USV and the USV with the highest risk of collision are exchanged. This USV navigates according to the latest desired location after the exchange.

Since the desired location contains a time and location coordinates, the entire navigation can be completed by only cycling the control so that the USV always follows the corresponding latest desired location to navigate.

It needs to be noted that the above system may be combined with the USV's own control unit to complete the navigation of the USV. The above system may also be independently set to be connected and communicate with the USV's own control unit, to acquire required physical parameters from the USV's own control unit, and to send a control instruction to the USV's own control unit, so that the USV is controlled to navigate by the USV's own control unit.

According to a third aspect of the present disclosure, a computer-readable storage medium is provided, storing a computer program thereon. The computer program, in a case of being executed by a processor, implements steps of the method.

It needs to be noted that depending on the needs of implementations, individual steps/components described in the present application may be split into more steps/components, or two or more steps/components or partial operations of the steps/components may be combined to form new steps/components to realize the purpose of the present disclosure.

It is easily understood by those skilled in the art that the above is only optional embodiments of the present disclosure and is not used to limit the present disclosure, and any modification, equivalent replacement, improvement, etc.

made within the spirit and principle of the present disclosure should be included in the scope of protection of the present disclosure.

What is claimed is:

1. A method for formation control for an USV swarm via a CEDRL, comprising:

designing a desired formation pattern based on a formation hierarchical virtual leader strategy, establishing aUSV desired location library, assigning a location index to a desired location of each USV in a formation, and establishing a matching relationship between the USV and the corresponding desired location;

updating the desired location of each USV and the corresponding location index via aUSV formation local consensus strategy in a case where there is a risk of collision between USVs; and acquiring an actual geolocation of each USV in real time, and adopting a surface vessel control decision-making network to direct the USV toward a corresponding latest desired location; wherein the surface vessel control decision-making network is obtained by training based on the CEDRL.

2. The method according to claim 1, wherein the location index comprises a layer index and an intra-layer index to enable the USV to query the desired location in the USV desired location library according to the layer index and the intra-layer index of the desired location; and index values of the corresponding layer index and intra-layer index are updated according to the USV formation local consensus strategy.

3. The method according to claim 2, wherein according to the location index, the desired location of the USV is expressed as: desired location coordinates of a k-th USV of an l-th layer in the formation at a specific moment.

4. The method according to claim 1, wherein a case that there is the risk of collision between the USVs is judged specifically in a following manner:

in a case of an USV formation and a formation pattern change, if there is an USV in the formation whose actual geolocation is at a distance greater than a preset value from a desired location, and there is another USV in the formation between the actual geolocation and the desired location of the USV, determining that the USV is at risk of collision.

5. The method according to claim 4, wherein the USV formation local consensus strategy specifically comprises:

using the USV that is at risk of collision as a current controlled USV; and constructing a set of USVs that are in conflict with the current controlled USV by comparing an actual geolocation and desired location of the current controlled USV, finding an USV with a highest risk of collision, and exchanging location indexes of the two USVs.

6. The method according to claim 1, wherein the CEDRL comprises designs of a state space, an action space, a decision-making network, and a reward function.

7. The method according to claim 6, wherein the state space comprises a motion state of an USV, as well as a relative angle and distance between the USV and a desired location; and the action space comprises a control input of the USV, comprising: thrust in a heave direction and torque in a yaw direction.

8. The method according to claim 6, wherein the reward function is set by a distance between an actual geolocation and desired location of an USV, an error angle between an actual heading angle of the USV and a desired heading angle of the USV, a component of a speed of the USV at the error angle, and corresponding weight coefficients.

9. The method according to claim 8, wherein a manner for training the surface vessel control decision-making network specifically based on the CEDRL comprises:

storing, via a parallel exploration of individuals in the USV formation, exploration experience into a shared experience pool to be used to train the surface vessel control decision-making network; and synchronizing decision-making network parameters at preset intervals, balancing a learning progress of the surface vessel control decision-making network, and promoting an overall training progress until a predetermined effect is achieved.

10. A computer-readable storage medium, storing a computer program thereon, wherein the computer program, in a case of being executed by a processor, implements steps of the method according to claim 1.

11. A system for formation control for aUSV swarm via a CEDRL, comprising:

a USV desired location library, designing a desired formation pattern based on a formation hierarchical virtual leader strategy, being established, assigning a location index to a desired location of each USV in a formation, and establishing a matching relationship between the USV and the corresponding desired location;

a location index updating unit, configured to update the desired location of each USV and the corresponding location index via an USV formation local consensus strategy in a case where there is a risk of collision between USVs; and a USV control unit, configured to acquire an actual geolocation of each USV in real time, and adopt a surface vessel control decision-making network to direct the USV toward a corresponding latest desired location; wherein the surface vessel control decision-making network is obtained by training based on the CEDRL.

12. The system according to claim 11, wherein the system is set in each USV in the formation, and each USV acquires an own actual geolocation via a sensor, and acquires an actual geolocation of another USV in the formation via inter-vessel communication links.

* * * * *